United States Patent [19]

Hashimoto et al.

[11] 4,107,705
[45] Aug. 15, 1978

[54] BLADED SHUTTER

[75] Inventors: Akihiko Hashimoto; Fuzio Enomoto, both of Hachioji, Japan

[73] Assignee: Olympus Optical Co., Ltd., Tokyo, Japan

[21] Appl. No.: 729,275

[22] Filed: Oct. 4, 1976

[30] Foreign Application Priority Data

Oct. 28, 1975 [JP] Japan ............................ 50-147137[U]
Oct. 28, 1975 [JP] Japan ............................ 50-147138[U]

[51] Int. Cl.$^2$ .............................................. G03B 7/14
[52] U.S. Cl. ....................................... 354/29; 354/31; 354/138; 354/230; 354/258
[58] Field of Search ..................... 354/29, 30, 258–260, 354/137, 138, 27, 31, 38, 230

[56] References Cited

U.S. PATENT DOCUMENTS

| 3,149,548 | 9/1964 | Kromer et al. ........................ 354/138 |
| 3,757,655 | 9/1973 | Kobayashi ............................. 354/29 |
| 3,984,847 | 10/1976 | Kato ..................................... 354/29 |

*Primary Examiner*—John Gonzales

*Attorney, Agent, or Firm*—Ostrolenk, Faber, Gerb & Soffen

[57] ABSTRACT

A bladed shutter comprises a plurality of shutter blades, also serving as a diaphragm, which are supported by a shutter opening ring and a shutter closing ring, both disposed in a concentric manner. The shutter opening ring is rotated in response to the actuation of a shutter release to drive the shutter blades in their opening direction. The rotation of the shutter opening ring is delayed by a governor. A shutter control circuit contained within a camera and including a photoelectric transducer element controls the rotation of the shutter closing ring, and enables its rotation to close the shutter blades when a photometric value reaches a proper exposure value. The speed of rotation of the shutter opening ring is changed under the control of the governor, by modifying the relative position of the governor to the shutter opening ring by means of a governor control circuit including a photoelectric transducer element which is provided externally of the camera. Also, the timing of closing of the X-contact is made adjustable in accordance with the range setting, thus permitting automatic strobo photographing in a simple manner.

6 Claims, 10 Drawing Figures

BLADED SHUTTER

BACKGROUND OF THE INVENTION

The invention relates to a bladed shutter, and more particularly, to a programmed bladed shutter having improved governor and X-contact assembly.

One blade shutter known in the art and capable of a programmed operation is of the type in which shutter blades also function as a diaphragm and in which the operation is controlled by a governor and a shutter control circuit including a light receiving element internally housed within the camera. In known shutters of his type, the manner of their operation or a change in the shutter opening with time, in uniformly designed to provide a programmed operation in which the maximum opening is located at the apex of a traiangular profile. It is impossible to have a trapezoidal profile having the maximum opening for a certain interval, rendering it difficult to perform a high speed shutter operation.

On the other hand, when a strobo photographing is intended with a camera having a bladed shutter, it is necessary to closely relate the distance to an object being photographed to a diaphragm aperture in accordance with a guide number. When the lens shutter also functions as a diaphragm to provide a programmed operation, the choice and establishment of a proper opening is even more difficult, resulting in a complication of the overall arrangement.

SUMMARY OF THE INVENTION

It is first object of the invention to provide a bladed shutter which, in addition to providing a programmed operation of a triangular profile, is capable of providing a manner of operation, such as a trapezoidal profile, which can be advantageously used to perform a high speed operation.

In accordance with the invention, there is provided a photoelectric transducer element which is housed within a camera, and additionally another photoelectric transducer element is provided externally of the camera and is contained in a control circuit adapted to drive an electromagnet for displacing a governor. In this manner, the manner of engagement between the governor and the bladed shutter is changed to achieve a manner of operation which permits a high speed shutter operation in a simple and automatic manner, rather than providing a programmed operation alone. When a strobo photographing is desired, a high speed shutter operation is automatically performed while maintaining the diaphragm in its maximum opening, namely, maintaining the shutter blades in their fully open position.

It is a second object of the invention to provide a bladed shutter of the kind described in which an X-contact, which is operated in response to an opening movement of bladed shutter, is closed at a variable timing in accordance with the distance to an object being photographed.

In accordance with the invention, the distance between the terminals of the X-contact is adjusted in accordance with the distance to an object being photographed, without requiring a complicated mechanism or a troublesome operation, thus eliminating the need to establish a particular diaphragm opening in accordance with the distance to an object being photographed. In this manner, a strobo photographing can be performed in an extremely simple and automatic manner.

DETAILED DESCRIPTION OF PREFERRED EMBODIMENT

Figure 1:
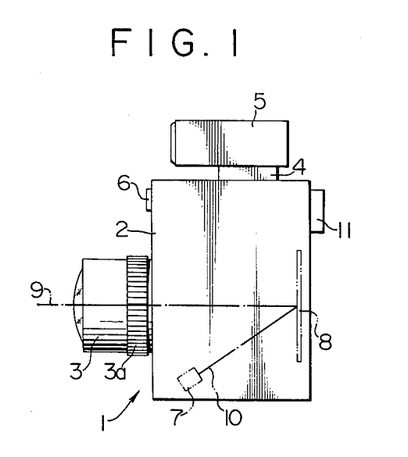
FIG. 1 is a schematic side elevation of a camera to which the invention is applied.

Referring to FIG. 1, there is shown a camera 1 to which the invention is applied. The camera 1 includes a body 2 having a picture taking lens barrel 3 mounted on the front surface thereof and having a hot shoe 4 mounted on its top surface. A strobo unit 5 may be mounted on the hot shoe 4. A photoelectric transducer element 6 such as a cadmium sulfide cell is disposed on the top of the front surface of the body 2 for receiving an external light for controlling a shutter governor. Another photoelectric transducer element 7 such as a photovoltaic element is disposed within the body 2 for controlling an exposure period. The element 7 is adapted to receive reflected light 10 from a film 8 as formed by a ray of light 9 passing through the barrel 3 and impinging on the film 8. On its top rear surface, the body 2 is provided with a finder eyepiece 11. For convenience of description, the element 7 will be referred as a first photoelectric transducer element and the element 6 as a second photoelectric transducer element.

Figure 2:
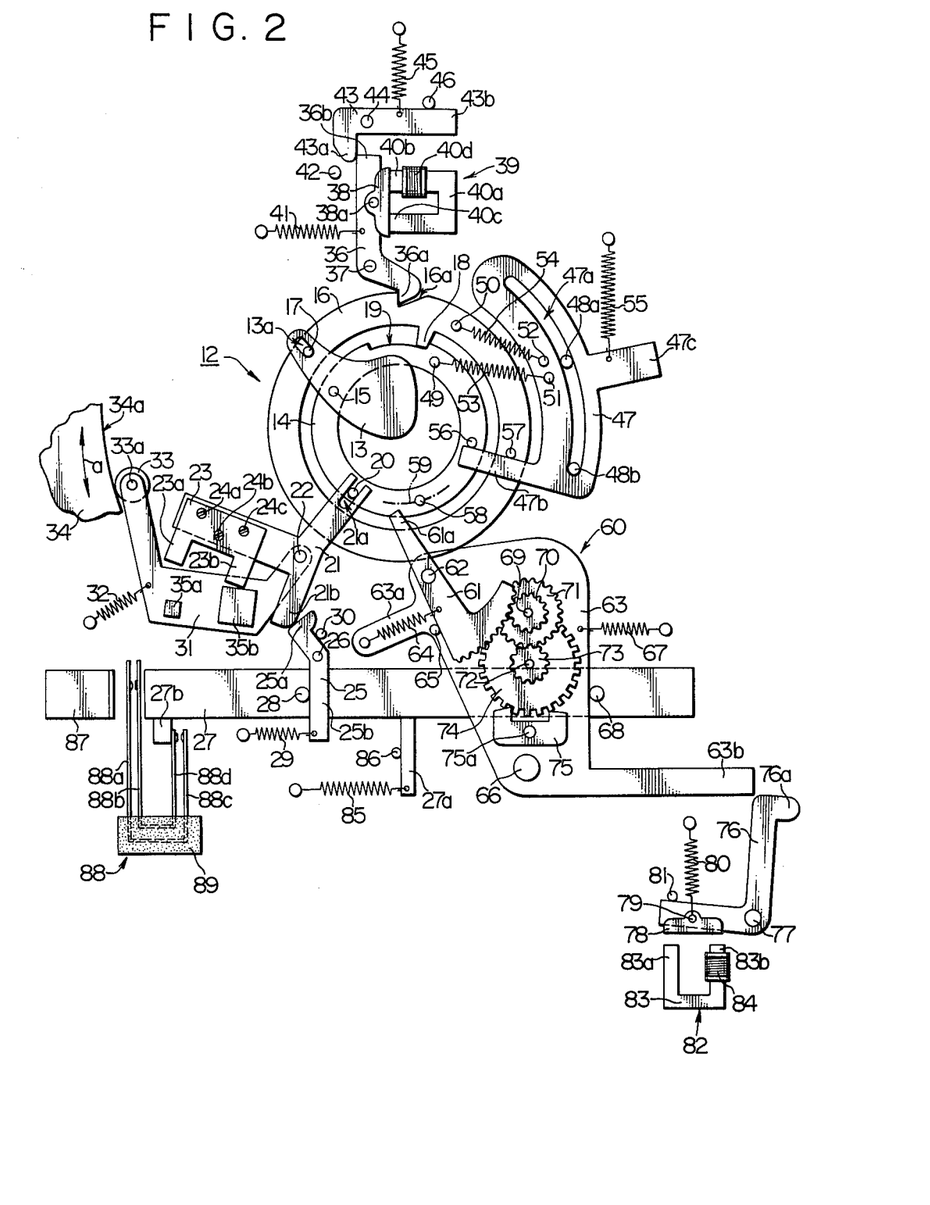
FIG. 2 is a front view of a bladed shutter according to the invention.

Referring to FIG. 2, there is shown a bladed shutter 12 according to the invention which is assembled into the barrel 3. In FIG. 2, the bladed shutter 12 includes a plurality of shutter blades 13 (only one being shown for the clarity of drawing), which are rotatably mounted on pins such as a pin 15 fixedly mounted on a shutter opening ring 14. A shutter closing ring 16 which is substantially concentric with the ring 14 is disposed outwardly of the shutter opening ring 14, and fixedly carries pins such as a pin 17 thereon, which is engaged by a radially extending elongate slot 13a formed in one end of the shutter blade 13.

The two rings 14, 16 are supported by means well known in the art so as to be rotatable about a common axis. A tab 18 extends radially inward from the inner periphery of the shutter closing ring 16 and is positioned within a recess 19 formed in the outer periphery of the shutter opening ring 14. It will be appreciated that the remainder of the plurality of shutter blades 13 are similarly supported by the two rings 14, 16.

In the lower portion as viewed in FIG. 2, the shutter opening ring 14 fixedly carries a pin 20, which is engaged by a forked end 21a of one arm of a switch lever 21 which is rotatably mounted on a stud 22. In addition to the arm carrying the forked end 21a, the lever 21 includes another arm having an end 21b adapted to be engaged by a detent lever 25, and a further arm to which a channel member 23 is secured by set screws 24a, 24b, 24c. The detent lever 25 has one arm having a detent end 25a which bears against the end 21b of the lever 21, and is rotatably mounted on a stud 26. The lever 25 has another arm 25b which, in the position shown in FIG. 2, bears against a pin 28 fixedly mounted on an elongated shutter release rod 27. The end of the arm 25b of the detent lever 25 is engaged by one end of a coiled spring 29, the other end of which is anchored to a stationary point, whereby the lever 25 is biased to rotate clockwise about the stud 26, thus bringing the detent end 25a into abutting relationship against a stop 30.

Rotatably mounted on the stud 22 on which the switch lever 21 is mounted is an X-contact support arm 31, which is biased by a coiled spring 32 to rotate counter-clockwise about the stud 22. On its free end, the support arm 31 fixedly carries a pin 33a on which is mounted a roller 33, which bears against a cam edge 34a of a cam member 34 under the action of the spring 32. The support arm 31 is centrally provided with a pair of terminals 35a, 35b fixedly mounted thereon, which are associated with a pair of sliding pieces 23a, 23b of the channel member 23 so as to form an X-contact. The terminal 35b is larger in size than the other terminal 35a so as to normally maintain contact with the sliding piece 23b. The cam member 34 is operatively associated with a range ring 3a (see FIG. 1) mounted on the lens barrel 3 so as to undergo a rotational displacement in the direction of an arrow a (see FIG. 2), thereby angularly moving the support arm 31 about the stud 22 through the roller 33 in order to adjust the distance between the sliding piece 23a and the terminal 35a of the X-contact.

In an upper portion around the circumference thereof, the shutter closing ring 16 is formed with a recess 16a, which is engaged by a barb 36a formed on one arm of a second detent lever 36. The detent lever 36 is rotatably mounted on a stud 37, and has another arm carrying a pin 38a on which is mounted an armature 38 associated with a pair of pole pieces 40b, 40c of a core 40a of an electromagnet 39. The electromagnet 39 also includes a coil 40d disposed on the core 40a and which is adapted to receive an electrical signal in order to attract the armature 38. The detent lever 36 is biased by a coiled spring 41 engaging therewith so as to rotate counter-clockwise about the stud 37. However, the resulting angular motion of the detent lever 36 is limited by a stop 42. However, in the position shown in FIG. 2, the end 36b of the opposite arm of the detent lever 36 on which the armature 38 is mounted is engaged by a detent piece 43a formed on one arm of a control lever 43, whereby the detent lever 36 is located at the same position as it assumes when the armature 38 is attracted by the electrogmagnet 39. The control lever 43 is rotatably mounted on a stud 44, and has another arm which is engaged by one end of a coiled spring 45, the other end of which is anchored to a stationary point, whereby the control lever 43 is biased to rotate counter-clockwise about the stud 44 until the arm 43b bears against a stop 46.

Disposed to the right, as viewed in FIG. 2, of the shutter closing ring 16 is a shutter charging lever 47 which is formed with an arcuate slot 47a concentric with both rings 14, 16 and which is engaged by a pair of stationary pins 48a, 48b, thus making the lever 47 displaceable to the extent permitted by the engagement between the slot 47a and the pins 48a, 48b. Pins 49, 50 are fixedly mounted on the rings 14, 16, respectively, in their upper, right-hand portion while a pair of pins 51, 52 are fixedly mounted centrally on the shutter charging lever 47. A pair of shutter charging, coiled springs 53, 54 extend between the pins 49, 50 on one hand and the pins 51, 52 on the other hand. The lever 47 also includes a lower arm 47b which extends to overlie both rings 14, 16, and additionally includes another arm 47c which extends to the right from the central region thereof. The arm 47c is engaged by a coiled spring 55 which urges the lever 47 to move in an upward direction, thus bringing the lower edge of the slot 47a into abutment against the pin 48b. Under this condition, the arm 47b bears against the underside of a pair of shutter charging pins 56, 57, which are fixedly mounted on the rings 14, 16, respectively.

In the lower region, the shutter opening ring 14 has a speed reduction pin 58 fixedly mounted thereon, and a shutter governor 60 inlcudes a primary sector-shaped gear 61 having its arm 61a extending to a position near, but below the path 59 of rotation of the pin 58. The sector-shaped gear 61 is pivotally mounted on a stud 62 which is fixedly mounted on a governor support plate 63. A coiled spring 64 extends between the gear 61 and an arm 63a which extends to the left from the support plate 63, thus urging the gear 61 to rotate clockwise about the stud 62. However, the resulting movement is limited by its abutment against a stop 65 fixedly mounted on the support plate 63. The governor support plate 63 is in turn rotatably mounted on a stud 66 and a coiled spring 67 engages the right-hand portion thereof to bias it for clockwise rotation about the stud 66 until it bears against a stop 68 fixedly mounted on the shutter release rod 27.

The sector-shaped gear 61 meshes with a pinion 70 which is rotatably mounted on a stub shaft 69 fixedly mounted on the support plate 63. Another gear 71 is also rotatably mounted on the shaft 69 integrally with the pinion 70, and meshes with a pinion 73 which is rotatably mounted on another stub shaft 72 fixedly mounted on the support plate 63. An escape wheel 74 integral with the pinion 73 is also mounted on the shaft 72, and is engaged by an anchor escapement 75 which is rockably mounted on a pin 75a fixedly mounted on the support plate 63. The governor support plate 63 also includes a rightwardly extending lower arm 63b, the end of which is located opposite to a detent piece 76a formed on one arm of a governor release lever 76. The lever 76 is rotatably mounted on a stud 77, and has another arm which carries a stud 79 on which an armature 78 is mounted. A coiled spring 80 extends between the stud 79 and a stationary point to bias the lever 76 to rotate clockwise about the stud 77. However, the resulting angular motion is limited by the abutment of its arm against a stop 81. The armature 78 is associated with a pair of pole pieces 83a, 83b formed on a core 83 of a governor locking solenoid 82. The solenoid 82 includes a coil 84 disposed on the core 83 and which is adapted to be energized to attract the armature 78. In addition, the solenoid 39 will be referred as a first solenoid while the solenoid 82 as a second.

The shutter release rod 27 is disposed so as to be slidable in the horizontal direction or to the right and left, as viewed in FIG. 2, and has a downwardly extending arm 27a, which is engaged by a coiled spring 85, which biases the release rod 27 to move to the left until the arm 27a bears against a stop 86. A shutter release button 87 is disposed to the left of the release rod 27, and disposed in the space therebetween are a pair of resilient contact blades 88a, 88b, of a main switch 88. The contact blades 88a, 88b are mounted in an insulating support 89 at their one end and are electrically connected with another pair of resilient contact blades 88c, 88d, respectively. The contact blades 88c, 88d are disposed so as to be closed by a projection 27b downwardly depending from the shutter release rod 27 at the left-hand end thereof.

Figure 3:
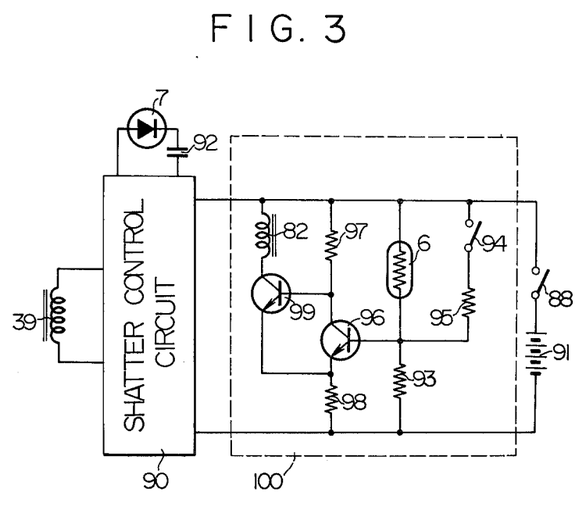
FIG. 3 is a circuit diagram of the control circuit used in the bladed shutter shown in FIG. 2.

As shown in FIG. 3, the solenoid 39 which controls an exposure period is connected in a shutter control circuit 90 which is in turn connected through the main switch 88 with a d.c. supply 91. The circuit 90 includes the photoelectric transducer element 7 and a capacitor 92 connected in series therewith, which together form a photometric device.

Connected between the main switch 88 and the negative terminal of the supply 91 is a series circuit path including the photoelectric transducer element 6 and a resistor 93, and the junction therebetween is connected with the base of a transistor 96 and also connected with one end of a resistor 95, the other end of which is connected with the movable contact of a strobo switch 94 having its stationary contact connected with the main switch 88. The transistor 96 has its collector connecte through a resistor 97 with the main switch 88 and its emitter connected through a resistor 98 with the negative terminal of the supply 91. The junction between transistor 96 and resistor 97 is connected with the base of another transistor 99 having its collector connected through the governor controlling electromagnet 82 with the main switch 88. The emitter of the transistor 99 is connected with the junction between the emitter of the transistor 96 and the resistor 98. The circuit comprising the photoelectric transducer element 6 and the transistors 96, 99 constitute a control circuit for the electromagent 82, or a governor control circuit 100.

In the bladed shutter according to the invention, it will be noted that the switch lever 21, detent lever 25 and stop 30 constitute together a detent mechanism for the shutter opening ring; the detent lever 36, armature 38 and electromagnet 39 constitute together a detent mechanism for the shutter closing ring; and the coiled springs 53, 54, the pins 56, 57 and shutter charging lever 47 constitute together a shutter charging mechanism. However, it is to be understood that various modifications can be made in these mechanisms by one skilled in the art.

In operation, FIG. 2 shows an initial condition of the bladed shutter 12 in which the various members and elements are in their inoperative position. Under this condition, the shutter opening ring 14 is locked in its starting position by means of pin 20, switch lever 21, detent lever 25 and stop 30 while the shutter closing ring 16 is also locked in its starting position by the detent lever 36, control lever 43 and stop 46. The shutter blades 13 remain closed. When it is desired to take a picture, a focussing operation is performed as well as an actuation of the shutter charging lever 47. If the strobo unit 5 (see FIG. 1) is mounted upon the hot shoe, the strobo switch 94 (see FIG. 2) is closed before these operations take place. However, in the description to follow, it is assumed that the strobo unit 5 is not so mounted and hence the strobo switch 94 remains open.

A focussing operation takes place by turning the range ring 3a (see FIG. 1). As the ring 3a is turned, the cam member 34 moves in following relationship therewith to drive the support arm 31 for the X-contact through the roller 33, causing an angular movement thereof about the stud 22. In this manner, the position of the terminals 35a, 35b of the X-contact relative to the sliding pieces 23a, 23b of the channel member 23 is adjusted, thus automatically determining a timing at which the X-contact is to be closed in accordance with the distance to an object being photographed. Thus, the cam member 34 and the support arm 31 constitute means for adjusting the position of the terminal of the X-contact in the bladed shutter according to the invention.

Figure 4:
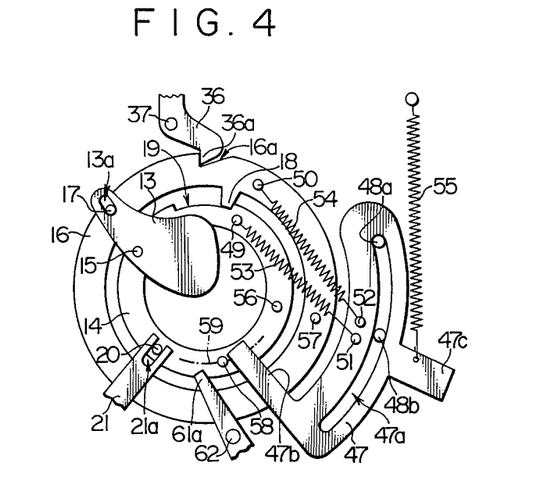
FIGS. 4 to 8 are front views of various parts of the bladed shutter in different phases of operation.

A shutter charging operation takes place in the condition shown in FIG. 2 by depressing the arm 47c of the shutter charging lever 47 to the full extent as permitted by the engagement between the pins 48a, 48b and the slot 47a. Thereupon, the lever 47 assumes a position shown in FIG. 4, thus charging the coiled springs 53, 54. After the termination of a shutter charging operation, the shutter release button 87 (see FIG. 2) is depressed, whereupon it urges the shutter release rod 27 to move from the position shown in FIG. 2 to the right and also closes the circuit between the contact blades 88a, 88b of the main switch 88 (see FIG. 5). Now the shutter release rod 27 assumes a position shown in FIG. 5 in which the projection 27b urges the contact blades 88c, 88d into abutting relationship against each other, with the pin 28 displacing the detent lever 25 and with the stop 68 moving away from the governor support plate 63.

Figure 5:
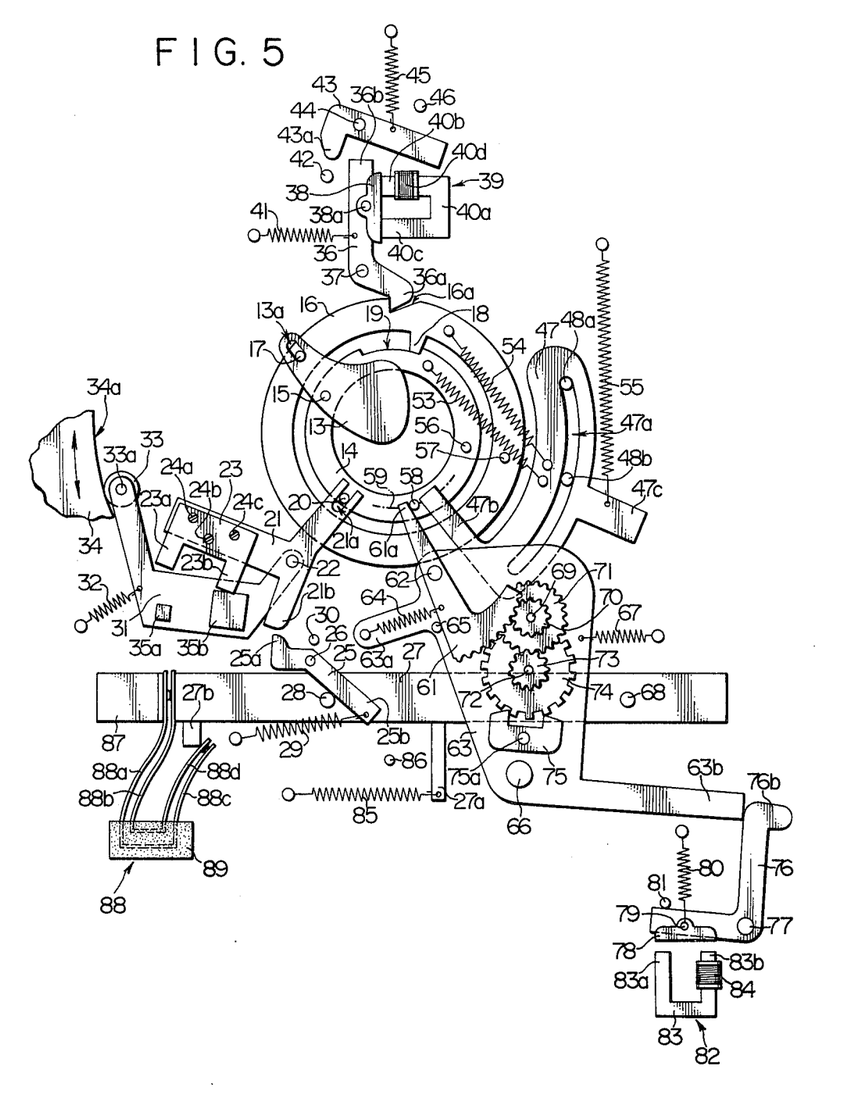

When the contact blades 88a, 88b and the contact blades 88c, 88d of the main switch 88 are closed, the electromagnet 39 shown in FIG. 3 is energized, and attracts the armature 38 of the detent lever 36, as shown in FIG. 5. The control lever 43 which locks the detent lever 36 is adapted to respond to a shutter release operation by displacing its detent piece 43a in a direction to be disengaged from the end 36b of the detent lever 36, but the electromagnet 39 operates to maintain the detent lever 36 in its initial position in place of the control lever. When the main switch 88 is closed, the shutter control circuit 90 including the photoelectric transducer element 7 (see FIGS. 1 and 3) and the capacitor 92 (see FIG. 3) commences its operation simultaneously with the electromagnet 39. Also the shutter governor controlling photoelectric transducer element 6 begins to operate.

Figure 8:
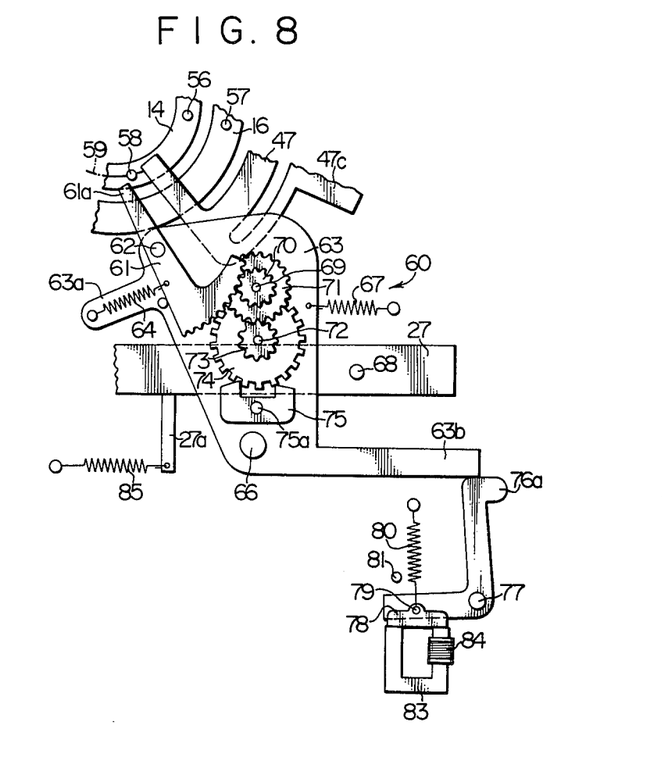

Referring to FIG. 3, when the photoelectric transducer element 6 reveives a reduced amount of light, it exhibits an increased resistance to raise the base potential of the transistor 96, causing the circuit including the transistor 96 and the resistors 97, 98 to conduct. Thereupon, the potential at the base of the transistor 99 is lowered, whereby the transistor 99 ceases to conduct. Conversely, when the transducer element 6 receives an increased amount of light to present a reduced resistance, the base potential of the transistor 96 is lowered, whereby the transistor 96 ceases to conduct. As a consequence, the increased base potential of the transistor 99 enables it to conduct, thus energizing the electromagnet 82. When the electromagnet 82 is energized, the armature 78 on the governor release lever 76 (see FIG. 2) is attracted, causing the lever 76 to rotate counter-clockwise about the stud 77 to lock the arm 63b of the governor support plate 63 with its detent end 76a, as shown in FIG. 8.

When the amount of light which impinges on the transducer element 6 is reduced, the electromagnet 82 is not energized and the governor support plate 63 is not locked. When the stop 68 on the shutter release rod 27 is disengaged from the support plate 63 under this condition, the support plate 63 is allowed to rotate clockwise about the stud 66 under the resilience of the coiled spring 67, whereby the arm 61a of the gear 61 moves into the path 59 of rotation of the speed reduction pin 58 on the shutter opening ring 14, as indicated in FIG. 5.

Figure 6:
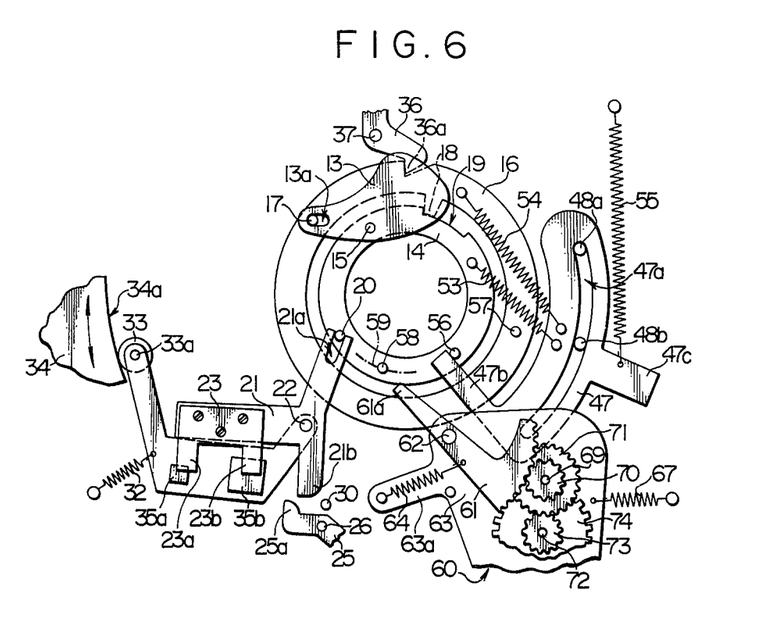

At this time, since the switch lever 21 is released from the detent lever 25, the shutter opening ring 14 is free to rotate clockwise under the resilience of the coiled spring 53 from the position shown in FIG. 5 to a position shown in FIG. 6 in which the lefthand edge of the recess 19 abuts against the tab 18 on the shutter closing ring 16. When the shutter opening ring 14 rotates in this manner, the speed reduction pin 58 thereon moves the arm 61a of the gear 61, and during such movement, the speed of rotation of the ring 14 is adjusted by the governor 60. On the other hand, the switch lever 21 rotates counter-clockwise about the stud 22 as a result of its forked end 21a being driven by the pin 20 on the ring 14, thus bringing the sliding piece 23a of the channel plate 23 into contact with the terminal 35a of the X-contact. Since the other sliding piece 23b is maintained in contact with the terminal 35b from the beginning, the X-contact is closed by the operation of the switch lever 21. The timing at which the X-contact is closed is determined by the distance between the terminal 35a and the sliding piece 23a which is adjusted in accordance with the distance to an object being photographed. The X-contact is closed even if the strobo unit 5 (see FIG. 1) is not mounted. In the apparatus of the invention, it is possible to provide an electrically integral connection between the sliding piece 23a and the terminal 35b through means other than the sliding motion.

As the shutter opening ring 14 rotates, the resulting displacement of the pin 15, for example, causes the associated shutter blade 13 to rotate counter-clockwise about the pin 17 on the shutter closing ring 16. In this manner all of the blades move from the closed position shown in FIG. 5 to the open position shown in FIG. 6 with a speed of rotation corresponding to that of the shutter opening ring 14. When the pin 58 is disengaged from the arm 61a of the gear 61 toward the end of rotation of the shutter opening ring 14, the coiled spring 64 returns the gear 61 to its initial position.

Figure 7:
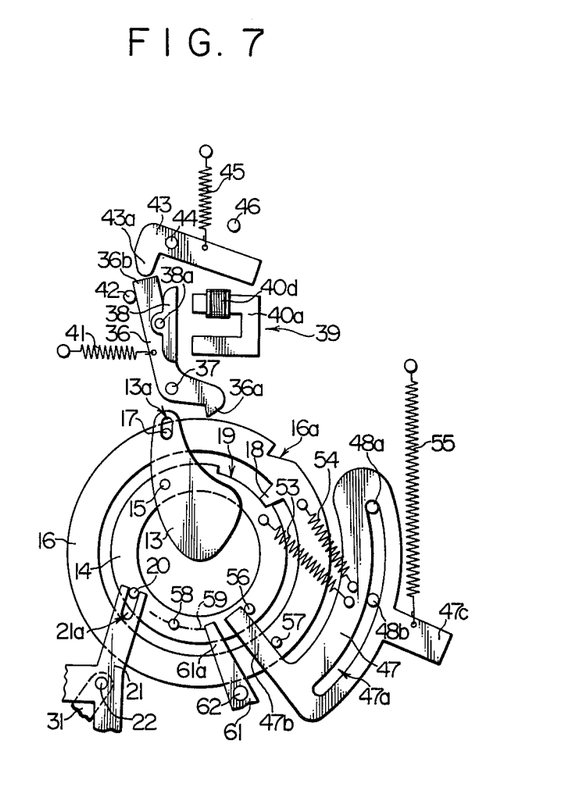

When the shutter control circuit 90 (see FIG. 3) commences its operation in response to a shutter release, the transducer element 7 cooperates with the capacitor 92 to determine an exposure period by photometry. When a proper exposure period has passed, the control circuit 90 deenergizes the electromagnet 39. Thereupon, the armature 38 is released, whereby the detent lever 36 rotates counter-clockwise about the stud 37 under the resilience of the coiled spring 41 (see FIG. 5) until it bears against the stop 42, thus releasing the shutter closing ring 16 as shown in FIG. 7. When released, the shutter closing ring 16 rotates under the resilience of the coiled spring 54 until the tab 18 thereon bears against the right-hand edge of the recess 19 formed in the shutter opening ring 14, thus moving from the position shown in FIG. 6 to the position shown in FIG. 7. The shutter blades 13 now rotate clockwise about the pin 15 as a result of the displacement of the pin 17, thus moving from the open position shown in FIG. 6 to the closed position shown in FIG. 7. This completes one cycle of taking one frame of picture on the film.

When the amount of light which impinges on the transducer element 6 (see FIG. 3) is high, the electromagnet 82 is energized to lock the governor support plate 63 (see FIG. 8). When this occurs, the arm 61a of the sector-shaped gear 61 cannot move into the path 59 of movement of the speed reduction pin 58 on the shutter opening ring 14 in response to a shutter release, with consequence that the speed of rotation of the shutter opening ring is not controlled, permitting it to operate at a high speed under the resilience of the coiled spring 53.

Figure 9:
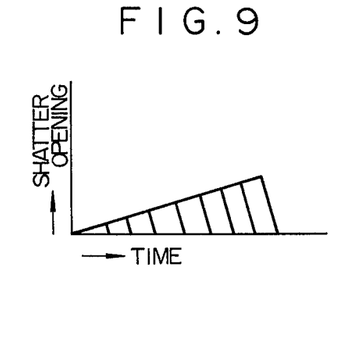
FIGS. 9 and 10 graphically shown the modes of operation of the bladed shutter according to the invention.
Figure 10:
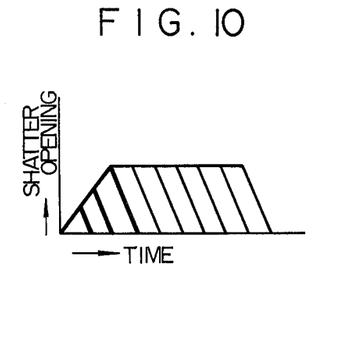

FIG. 9 graphically shows the operation of the bladed shutter 12 when the transducer element 6 receives a reduced amount of light to energize the electromagnet 83, thus rendering the shutter governor 60 operative. FIG. 10 shows a corresponding operation of the bladed shutter 12 when the transducer element 6 receives an increased amount of light to inhibit the energization of the electromagnet 83, thus making the shutter governor 60 inoperative. Thus, FIG. 9 shows a programmed shutter operation while FIG. 10 shows a high speed shutter operation. By using a coiled spring 53 of a greater resilience than the coiled spring 54, the shutter closing ring 16 may be actuated in a manner such that it follows the operation of the shutter opening ring 14, thereby achieving a high speed shutter operation of a triangular profile as indicated in thick lines in FIG. 10.

When the strobo unit 5 (see FIG. 1) is mounted on the camera 2, its mounting closes the strobo switch 94 (see FIG. 3), whereby the level adjusting resistor 95 is connected in shunt with the transducer element 6. Since the transducer element 6 receives an increased amount of light in this instance, the transistor 96 is rendered non-conductive. Consequently, the transistor 99 can conduct to energize the electromagnet 82, whereby the bladed shutter 12 operates in a high speed operation as illustrated in FIG. 10. The strobo unit 5 provides an illumination while the bladed shutter 12 operates at a high speed, and since an increased opening is established in the diaphragm, pictures at a greater distance can be taken, enabling a synchronized photographing in a daytime. It will be apparent that the described shutter operations can be achieved by a suitable choice of the resistance of the resistors 93, 95, 97, 98 and of the magnitude for an output from the transducer element 6.

When one frame of the film has been exposed, the shutter charging lever 47 and the control lever 43 are returned to their initial position in interlocked relationship with a film winding operation. The arm 47b of the shutter charging lever 47 moves the pins 56, 57 on the shutter opening ring 14 and the shutter closing ring 16, respectively, to return these rings to their initial position while the control lever 43 again locks the detent lever 36. When the shutter opening ring 14 is returned to its initial position, the switch lever 21 is also returned to its initial position and locked by the detent lever 25. When returning to its initial position, the shutter closing ring 16 is locked by the detent lever 36. Since the rings 14, 16 are returned simultaneously, the shutter blades 13 return to the initial position while closing the shutter opening. The detent pin 68 on the shutter release rod 27 again locks the governor support plate 63, and locates the gear 61 in its inoperative position.

What is claimed is:

1. A bladed shutter for a camera including a plurality of shutter blades also serving as a diaphragm; a shutter opening ring and a shutter closing ring disposed in concentric manner with each other and being urged to rotate in the same direction, said rings cooperating with each other to pivotally support the plurality of shutter blades, the shutter blades being closed when said rings are in their starting position, being opened as the shutter opening ring precedes the shutter closing ring in movement and being closed again when both rings reach their terminal position; said shutter opening ring having a projection; first detent means movable between a first position wherein it locks said shutter opening ring in its initial position and a second position wherein it releases said shutter opening ring, said first detent means being urged into said first position prior to a shutter release operation, said first detent means being urged into said second position responsive to a shutter release operation; a governor movable between a first position lying out of the path of rotation of the projection on the shutter opening ring and a second position lying in the path of movement of the shutter opening ring, said governor being adapted to control the rate of rotation of the shutter opening ring; second detent means for selectively locking the shutter closing ring in its initial position; and shutter control means including a first photoelectric transducer element disposed within the camera to provide a photometry, the shutter control means also including an electromagnet which maintains the second detent means in its locking position until a photometric value obtained by the first transducer element reaches a level corresponding to a proper exposure, whereupon the electromagnet releases the second detent means; characterized by the provision of a second photoelectric transducer element located externally of the camera, a governor control circuit including said second photoelectric transducer element, and a second electromagnet associated with the governor control circuit for displacing the governor away from the path of movement of the shutter opening ring in accordance with a photometric value obtained by the second photoelectric transducer element, thereby varying the degree of engagement between the governor and the shutter opening ring.

2. A bladed shutter according to claim 1, further including a pair of terminals forming an X-contact which are closed in response to an opening operation of the bladed shutter, and means for adjusting the position of one of the terminals of the X-contact relative to the other terminal in accordance with a setting of a range ring.

3. The bladed shutter of claim 1 further comprising:
a shutter release rod movable between a first position wherein said shutter release rod locks said first detent means and said governor into their respective first positions and a second position wherein said shutter release rod permits said first detent means and said governor to move into their respective second positions;
means for normally biasing said shutter release rod into its first position; and
said shutter release rod being movable into said second position responsive to a shutter release operation.

4. The bladed shutter of claim 3 wherein said opening ring has a second projection and wherein said first detent means comprises:
a pivotable detent arm having first and second ends, said first end engaging said second projection and movable therewith;
a detent lever movable between a first position which locks said detent arm into a predetermined position and a second position which frees said detent arm.

5. A bladed shutter for a camera including a plurality of shutter blades also serving as a diaphragm; a shutter opening ring and a shutter closing ring disposed in concentric manner with each other and being urged to rotate in the same direction, said rings cooperating with each other to pivotally support the plurality of shutter blades, the shutter blades being closed when said rings are in their starting position, being opened as the shutter opening ring precedes the shutter closing ring in movement towards a terminal position and being closed again when both rings reach their terminal position; said opening ring having a projection; first detent means for locking the shutter opening ring in its initial position and for releasing the opening ring in response to a shutter release operation; said detent means comprising first and second swingable arms each carrying contacts which collectively form an X-contact assembly; means including a range ring for adjusting the position of one of said arms relative to the other; a shutter release rod; a detent arm locking said other arm prior to a shutter opening operation and releasing said other arm when said release rod is moved in a shutter opening direction; said other arm having a slot receiving said projection whereby said opening ring is released to thereby urge the X-contact towards engagement.

6. A bladed shutter for a camera including a plurality of shutter blades also serving as a diaphragm; a shutter opening ring and a shutter closing ring disposed in concentric manner with each other and being urged to rotate in the same direction, said rings cooperating with each other to pivotally support the plurality of shutter blades, the shutter blades being closed when said rings are in their starting position, being opened as the shutter opening ring precedes the shutter closing ring in movement towards a terminal position and being closed again when both rings reach their terminal position; said opening ring having a projection; first detent means for locking the shutter opening ring in its initial position and for releasing the opening ring in response to a shutter release operation, a movable governor being normally urged towards a position lying in the path of rotation of the projection on the shutter opening ring for delaying the rotation of the shutter opening ring; a photoelectric transducer element located externally of the camera, a governor control circuit including said photoelectric transducer element, and an electromagnet associated with the governor control circuit for displacing the governor away from the path of movement of the shutter opening ring in accordance with a photometric value obtained by the photoelectric transducer element, thereby varying the degree of engagement between the governor and the shutter opening ring, said governor comprising a swingable mounting plate, a governor arm pivotally mounted on said plate and bias means for urging the arm in a first direction, said plate being movable to position the arm in the path of said projection, gear means mounted on said plate for engaging said arm and cooperating with said bias means for retarding the rate of movement of the opening ring.

* * * * *